United States Patent [19]

Picozzi et al.

[11] Patent Number: 4,948,683
[45] Date of Patent: Aug. 14, 1990

[54] RESERVE ACTIVATED ELECTROCHEMICAL CELL WITH A CELL CONDITION CHECKING APPARATUS

[75] Inventors: James R. Picozzi, Hatfield; Norman A. Remer, Southampton, both of Pa.

[73] Assignee: Honeywell Inc., Minneapolis, Minn.

[21] Appl. No.: 386,652

[22] Filed: Jul. 31, 1989

[51] Int. Cl.$^5$ .............................................. H01M 6/36
[52] U.S. Cl. ...................................... 429/90; 429/116
[58] Field of Search .................. 429/90, 110, 113, 116

[56] References Cited

U.S. PATENT DOCUMENTS

| | | | |
|---|---|---|---|
| 3,514,338 | 5/1970 | Eekma | 429/90 |
| 3,563,806 | 2/1971 | Hruden | 429/116 |
| 3,656,340 | 4/1972 | Ball | 429/90 |
| 4,695,520 | 9/1987 | Koper et al. | 429/116 |
| 4,861,686 | 8/1989 | Snyder | 429/116 |

*Primary Examiner*—Donald L. Walton
*Attorney, Agent, or Firm*—Roger W. Jensen; Mitchell J. Halista

[57] ABSTRACT

A reserve activated electrochemical cell with a cell condition checking apparatus uses a sealed electrochemical fluid, e.g., an electrolyte, storing reservoir having an expandable pressurized capsule within the reservoir for pressurizing the fluid. The reservoir is provided with a rupturable diaphragm arranged as a fluid-tight seal across an opening in a wall of the reservoir. A selectively operable lance is arranged with a pointed end adjacent to the diaphragm for activating the cell by piercing the diaphragm to release the fluid into the electrode assembly. A reservoir leak indicator is located in the reservoir to provide an indication of a leakage path between the pressurized capsule and the fluid stored in the reservoir allowing a migration of the fluid into the capsule. In a first embodiment of the reservoir leak detector, a visual indication of fluid leakage is provided through a transparent window in a wall of the reservoir by a visual change in a fluid reactive substance located in the capsule. In a second embodiment, a conductive path is established by a fluid leakage between two spaced-apart non-reactive electrodes located within the reservoir and connected by respective conductive wires to respective locations external of the reservoir. In a third embodiment, the fluid leak detection is provided by an output signal representative of an electrochemical reaction between two spaced-apart reactive electrodes located within the pressurized capsule and connected by respective conductive wire to respective locations external of the reservoir.

13 Claims, 1 Drawing Sheet

RESERVE ACTIVATED ELECTROCHEMICAL CELL WITH A CELL CONDITION CHECKING APPARATUS

BACKGROUND OF THE INVENTION

Field of the Invention

The present invention relates to reserve activated electrochemical cells. More specifically, the present invention is directed to an improved reserve activated electrochemical cell containing an electrolyte reservoir for selectively releasing a stored electrochemical fluid to activate the electrochemical cell.

SUMMARY OF THE INVENTION

An object of the present invention is to provide an improved reserve activated electrochemical cell having an apparatus for checking the condition of an inactive or dormant reserve cell.

In accomplishing this and other objects, there has been provided, in accordance with the present invention, a reserve activated electrochemical cell including an electrolyte reservoir having an expandable reservoir pressurizing capsule, and reservoir leak detector means for detecting the presence of an electrochemical fluid within the pressurized capsule.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Figure 1:
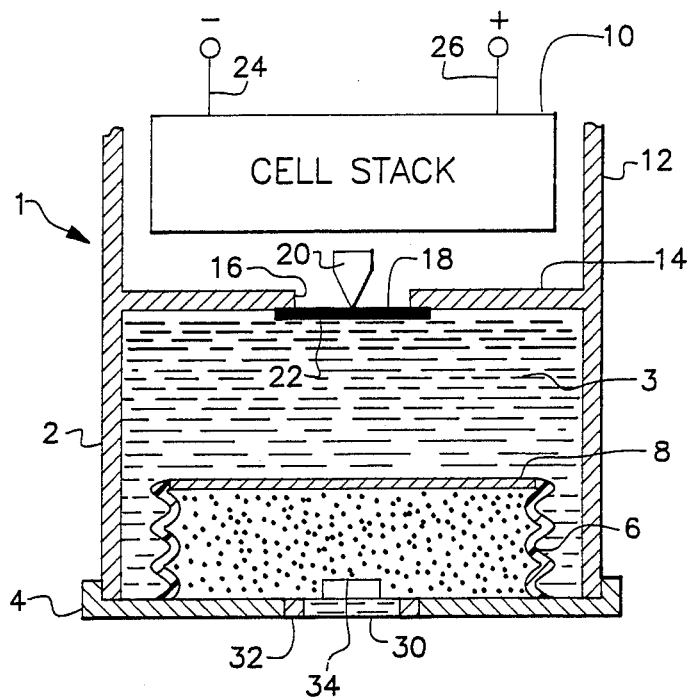
FIG. 1 is a cross-sectional illustration of a first embodiment of the present invention in a reserve activated electrochemical cell in an inactive electrochemical fluid storing state.

Referring to FIG. 1 in more detail, there is shown an electrochemical cell 1 in an inactive or electrochemical fluid storing state including a fluid reservoir 2 containing an electrochemical fluid 3, e.g., a thionyl chloride electrolyte for a lithium battery. The electrolyte reservoir 2 is closed at one end by a cap 4 forming a fluid-tight seal therewith. An expandable pressurized capsule 6 is located within the reservoir 2 to apply a pressure to the electrolyte 3. The capsule 6 contains a pressurized gas and is arranged with flexible sidewalls to allow the capsule to expand and to force the electrolyte from the reservoir 2 upon an activation of the cell 1, as discussed more specifically hereinafter. The capsule 6 is arranged to form a fluid-tight seal with the cover 4 to provide an internal volume within the capsule 6 between an end plate 8 attached to the flexible sidewalls of the capsule 6 and the cap 4 to accommodate the pressurizing gas. A cell stack or assembly 10 comprising a plurality of pairs of opposite polarity electrochemical plates, e.g., lithium battery anodes and cathodes, is located within a fluid-tight cell stack container 12, partially illustrated in FIG. 1. The cell stack container 12 may advantageously be formed as an extension of the electrolyte reservoir 2. An internal wall 14 is arranged to separate the cell stack container 12 from the electrolyte reservoir 2. The wall 14 is provided with a hole 16 extending therethrough to define an electrolyte conduit between the reservoir 2 and the cell stack container 12.

The hole 16 is covered by a rupturable diaphragm 18 which is peripherally attached to the wall 14 to form a fluid-tight seal across the hole 16. A selectively actuable lance 20 is positioned with a pointed end 22 located adjacent to the diaphragm 16. The other end of the lance 20 is arranged to be selectively operated by a suitable means (not shown) to selectively propel the lance 20 into the diaphragm 18 to rupture the diaphragm 18 and to enable the pressurized electrolyte 3 to enter the cell stack container 12 through the hole 16 to energize the reserve cell. This activation of the lance 20 may be by any suitable activating device, e.g., manual, explosive device, etc., such devices being well-known.

A first electrical connection to a first polarity electrode within the cell stack 10 is provided by a first connector 24. A second connector 26 is arranged to provide a second electrical connection to a second polarity electrode within the cell stack 10. A transparent window 30 of a suitable material, e.g., glass, is located in the end cap 4 and is attached to a sealing ring 34 connected, in turn, to the end cap 4 to provide a fluid-tight seal therebetween. A pellet or coating 34 of a material reactive with the electrolyte 3 is attached to an inner surface of the window 30. The reactive material is selected from a group of materials that will exhibit a visual change, e.g., color or size, in the presence of the electrolyte 3. Such a physical alteration of the pellet is observable from the exterior of the cell 1 to provide a readily observed condition check for the presence or absence of the electrolyte 3 in the gas space of the capsule 6.

The reserve cell illustrated in FIG. 1 is maintained in a dormant state by storing the electrolyte 3 in a separate reservoir 2 isolated from the cell stack 10. The electrolyte reservoir 2 is pressurized by the expandable capsule 6 containing a suitable pressurizing gas, e.g., argon. This pressurized reservoir 2 is effective to contain the pressurized electrolyte 3 in the dormant state of the cell 1 while allowing the electrolyte 3 to be delivered to the cell stack 10 when required to activate the reserve cell 1 following a piercing of the diaphragm 18 by the lance 20.

In conventional reserve cells, the condition of the reserve cells' electrochemical fluid reservoir system has been determined during the battery's assembly by monitoring the gas charge introduced within the capsule 6. After assembly of this gas capsule 6 within the reserve battery structure, the prior art provides no means for testing the reserve cell to determine if the cell would function properly upon an activation of the reserve cell. Such a malfunction could result from transportation shock and vibration which would produce a leakage path between the electrolyte 3 and the interior of the capsule 6. Advantageously, such a check of the status of the reserve cell should be made during a non-operating condition of the cell, i.e., prior to activation.

Thus, the prior art, such as that found in U.S. Pat. Nos. 3,773,563; 4,076,906; 4,135,384 and 4,693,119, is directed to various types of apparatus for indicating battery cell condition during an operating state of the battery. The present invention, on the other hand, is directed to an apparatus for checking the condition of the reserve cell during a dormant condition of the reserve cell. The migration of the electrolyte into the capsule 6 could result in failure of the battery to operate normally on demand or to corrode materials on the gas side of the capsule 6 resulting in leakage of the electrolyte 3 into the surrounding atmosphere. A visual check of the condition of the reactive pellet 34 provides a condition check of the gas space of the capsule 6 by indicating the presence or absence of the electrolyte 3 within the gas space while avoiding the attendant problems of an obvious prior art technique of x-raying the reservoir 2 to detect the presence of liquid within the gas space of the capsule 6.

Figure 2:
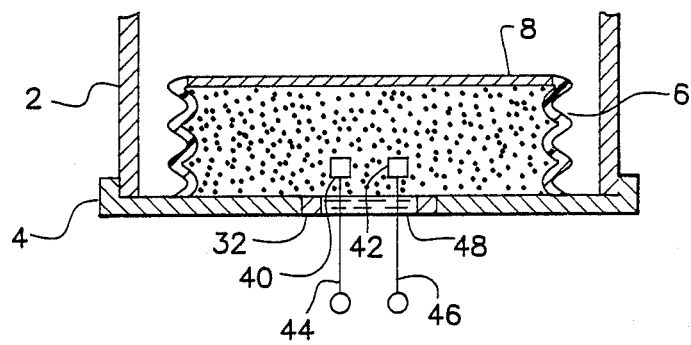
FIG. 2 is a partial cross-section of the cell shown in FIG. 1 illustrating a second embodiment of the present invention.

In FIG. 2, there is shown an alternate embodiment of the present invention in which a pair of spaced-apart electrodes 40,42 are located within the gas space of the capsule 6 and form a small electrochemical cell. The electrodes are connected by respective wires 44 and 46 extending externally of the cap 4 through a glass-to-metal seal 48 forming a fluid-tight connection between the wires 44 and 46 and the sealing ring 32. Selection of the anode and cathode electrodes would be based on the composition of the electrolyte to be detected. For example, a lithium anode and active carbon cathode could be utilized to detect leaking thionyl chloride. Thus, an electrolyte leakage into the gas space in the capsule 6 will activate the cell formed by the electrode 40,42 to develop a potential between the electrodes 40,42. This potential would appear externally of the reservoir 2 between the connecting wires 44 and 46 and could be detected by a high impedance voltage detection circuit (not shown) connected thereto, such circuits being well-known in the art. A modification of the illustrated configuration of FIG. 2 could be achieved by using a single electrode as a working electrode and using other components spaced apart from the single electrode, e.g., the cap 4 and the wall of the capsule 6 as the counter electrode by selecting suitable materials for those components. The output signal would, thus, appear between the single electrode and the other components, and the electode could be either positive or negative relative to those components.

Figure 3:
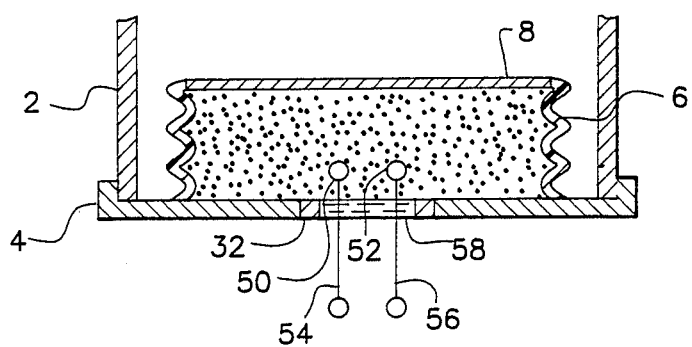
FIG. 3 is a partial cross-section of the cell shown in FIG. 1 illustrating a third embodiment of the present invention.

In FIG. 3, there is shown a third embodiment of the present invention utilizing a pair of spaced-apart electrodes 50,52 located within the gas space of the capsule 6. The electrodes 50,52 are selected to be non-reactive with the electrolyte 3. The electrodes 50,52 are connected by respective wires 54,56 through a glass-to-metal seal 58 providing a fluid-tight seal with the wires 54,56 and a sealing ring 32. The electrical resistance between the electrodes 54,56 would, in the absence of an electrolyte within the gas space of the capsule 6, be a very high value representing a substantially open circuit. An electrolyte leakage into the gas space of the capsule 6 would provide a conductive bridge or low resistance path between the electrodes 54 and 56. Such a change in the resistance could be readily detected by a suitable conventional electronic detector (not shown) connected to the wires 54,56 which could be used to sound an alarm or initiate a visual signal. The sensitivity of this embodiment could be enhanced by an application of a suitable coating bridging the two electrodes 54,56 which is non-conductive in the absence of electrolyte and is conductive or reacts with the electrolyte to change its resistive state. The present invention enables the monitoring of the electrolyte reservoir to avoid the problem of activating a defective reserve cell which either could not deliver a full measure of electrolyte 3 into the cell stack 10 or has deteriorated into an electrolyte leakage condition.

Accordingly, there has been provided, in accordance with the present invention, an improved reserve activated electrochemical cell structure having a cell condition checking apparatus with a cell condition checking apparatus.

The embodiments of the present invention in which an exclusive property or privilege is claimed are defined as follows:

1. An electrochemical cell comprising
    pressurized electrochemical reservoir means for storing an electrochemical fluid including an expandible pressurized capsule and an internal volume external to said capsule for accommodating the electrochemical fluid and
    reservoir leak detectors means for detecting the presence of the electrochemical fluid within said capsule.

2. A cell as set forth in claim 1 wherein said detector means includes a transparent window extending between an interior of said capsule and an exterior of said reservoir means and a substance reactive with the electrochemical fluid positioned within said capsule and visible through said window.

3. A cell as set forth in claim 2 wherein said substance changes color when contacted by the electrochemical fluid.

4. A cell asset forth in claim 2 wherein said substance changes size in said electrochemical fluid.

5. A cell as set forth in claim 1 wherein said detector means includes a pair of spaced-apart electrodes located within said capsule and having a reaction with the electrochemical fluid to produce a potential therebetween and a pair of fluid-tight electrically conductive means connecting said electrodes to respective locations external to said reservoir means.

6. A cell as set forth in claim 1 wherein said detector means includes a pair of spaced-apart electrodes located within said capsule and being non-reactive with respect to the electrochemical fluid, said electrodes having a high resistance path therebetween in the absence of the electrochemical fluid and a low resistance path therebetween in the presence of the electrochemical fluid and a pair of fluid-tight electrically conductive means connecting said electrodes to respective locations external to said reservoir means.

7. A cell as set forth in claim 1 wherein said reservoir means includes means for selectively releasing the fluid from said reservoir means.

8. A reserve activated electrochemical cell comprising
    pressurized electrochemical reservoir means for storing an electrochemical fluid including an expandible pressurized capsule and an internal volume external to said capsule for accommodating the electrochemical fluid and
    electrochemical stack container means for storing electrodes responsive to the fluid,
    selectively rupturable wall means for separating said reservoir means from said container means
    reservoir leak detectors means for detecting the presence of the electochemical fluid within said capsule.

9. A cell as set forth in claim 8 wherein said detector means includes a transparent window extending between an interior of said capsule and an exterior of said reservoir means and a substance reactive with the electrochemical fluid positioned within said capsule and visible through said window.

10. A cell as set forth in claim 8 wherein said substance changes color when contacted by the electrochemical fluid.

11. A cell as set forth in claim 8 wherein said substance changes size in said electrochemical fluid.

12. A cell as set forth in claim 8 wherein said detector means includes a pair of spaced-apart electrodes located within said capsule and having a reaction with the electrochemical fluid to produce a potential therebetween and a pair of fluid-tight electrically conductive means connecting said electrodes to respective locations external to said reservoir means.

13. A cell as set forth in claim 8 wherein said detector means includes a pair of spaced-apart electrodes located within said capsule and being non-reactive with respect to the electrochemical fluid, said electrodes having a high resistance path therebetween in the absence of the electrochemical fluid and a low resistance path therebetween in the presence of the electrochemical fluid and a pair of fluid-tight electrically conductive means connecting said electrodes to respective locations external to said reservoir means.

* * * * *